July 19, 1938.　　　M. H. WARD　　　2,123,979
THERMOSTATIC VALVE CONSTRUCTION
Filed May 22, 1936
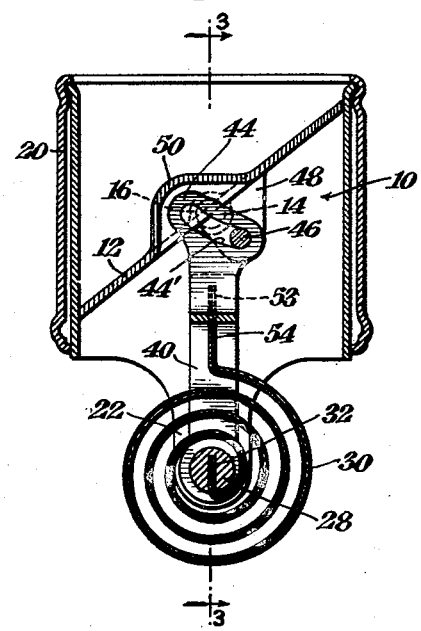
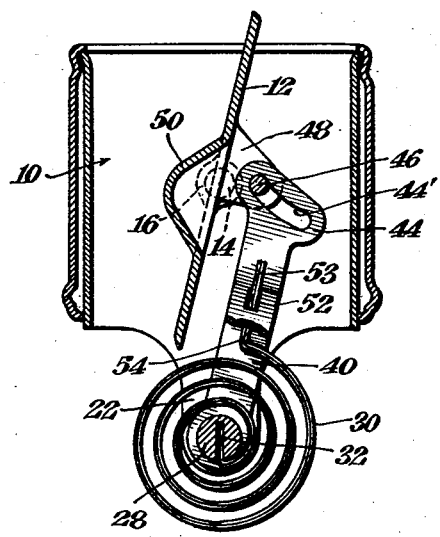
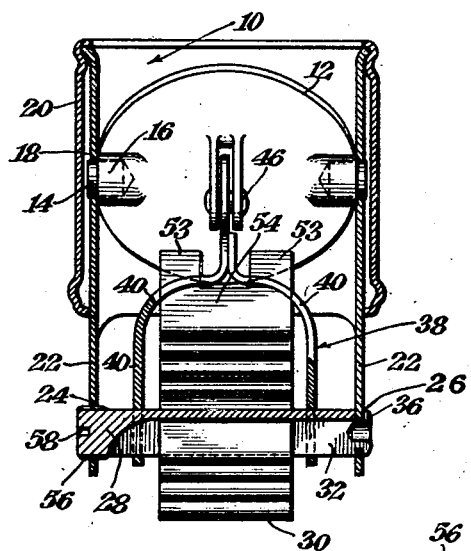
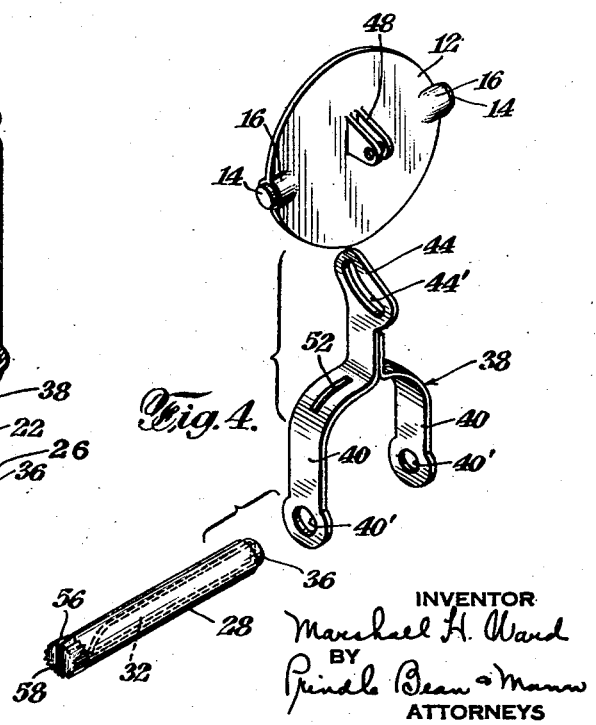
INVENTOR
Marshall H. Ward
BY
Prindle Bean & Mann
ATTORNEYS Patented July 19, 1938

2,123,979

UNITED STATES PATENT OFFICE 2,123,979

THERMOSTATIC VALVE CONSTRUCTION

Marshall H. Ward, Southport, Conn., assignor to Bridgeport Thermostat Company, Incorporated, Bridgeport, Conn.

Application May 22, 1936, Serial No. 81,163

9 Claims. (Cl. 236—34)

This invention relates to thermostatic valve constructions.

In thermostatic valve constructions which are to be used in water lines of water cooling systems for automobile engines, it is desirable to have the initial movement of the valve positively controlled at a slow rate. This will prevent an inrush of cold water from the radiator of the car, with consequent wide fluctuation of temperature. It is desirable to provide a construction which is cheap to manufacture, easy to assemble and which will have a minimum of working parts. Where thermostatic valve constructions are used to control the flow of liquid in systems other than engine cooling systems, it may be desirable to have the valve move different amounts for different positions of the thermostat.

According to my invention I have provided a thermostatic construction in which the connection between the thermostatic element and the valve operating arm comprises a slot and pin construction. The slot has a cam surface so that the rate of movement of the valve may be controlled. As shown in the drawing the cam surface is made of such form as to have the valve open slowly for about the first third of its movement and then to open faster to fully open position. By changing the shape of the cam surface, different opening movements of the valve may be obtained and I do not want to be restricted to the form shown. The shape of the cam surface controls the amount of movement transmitted to the valve, so that while the rate of movement of the bimetallic coil may be constant per degree change in temperature, the rate of movement of the valve may be controlled by the cam surface in any manner desired, within limits. I have shown the best form to me known at this time but it is to be understood that this is only for purpose of illustration and I am not to be restricted thereto. While I have shown a thermostatic bimetallic coil, which is the preferred form, I do not want to be limited thereto.

In the drawing:

Fig. 1 represents a vertical cross section of the device;

Fig. 2 represents a similar vertical cross section showing the valve in open position;

Fig. 3 represents a vertical cross section taken substantially on line 3—3 of Fig. 1; and Fig. 4 represents an exploded view of the valve, the yoke member having a slot provided with a cam surface and the rod on which the yoke member is mounted.

Referring now to the drawing, the reference character 10 designates a tubular member adapted to be inserted in hose lines, conduits, etc. Pivotally mounted in member 10 is a valve 12 having trunnions 14 in sockets 16 of the valve. The trunnions are received in openings 18 of the wall of the tubular member 10. A sleeve 20 surrounds the member 10 to form a smooth sheath or covering therefor and prevent the ends of trunnions 14 from being caught or mutilated when the device is inserted in hose lines and the like.

Tubular member 10 has lower extensions 22 provided with alined openings 24 and 26 for receiving a rod 28. One end of a coiled bimetallic thermostatic element 30 is received in slot 32 of the rod 28. It is to be noted that opening 26 is smaller than opening 24 for receiving the reduced end 34 of rod 28. This reduced end 34 is spun over as shown at 36 in Fig. 3 to hold the rod 28 in stationary position when the proper positioning of the thermostatic element has been obtained.

Pivotally mounted on rod 28 is yoke member 38 connected with the valve 12 and adapted to transmit movement from the thermostatic element to the valve. Yoke member 38 comprises two arms 40 which are bent toward each other at their upper ends. The arms 40 are spaced apart at their lower ends which are provided with openings 40' to receive the rod 28. The upper ends of arms 40 are bent into contact and are suitably secured together by any suitable means. One of these arms 40 is provided at its upper end with an enlarged head 44 having a curved slot 44', one side of which forms a cam surface which controls the rate of movement of the valve. The slot 44' receives pin 46 mounted on clevis 48, the clevis being formed on the valve 12 and depending from the under side thereof. When the parts are in the position shown in Fig. 1, it will be seen that one end portion of the enlarged head 44 on the arm 40 extends into and through the plane of the valve 12 and therefore the valve is provided with a dome-shaped depressed portion 50 in order to receive this portion of the head to permit operation of the valve properly.

The arms 40 of the yoke member 38 are provided with openings 52 in their curved portions to receive projections 53 formed on one end 54 of the coiled bimetallic thermostatic element 30. By this construction, it will be apparent that the end 54 of the thermostatic element is connected with the yoke member 38 so that movement of the thermostatic element will move the yoke member 38 on its pivot and this in turn will operate the valve 12.

When the device is first assembled, it is necessary to adjust the parts for proper operation of the device, and for this purpose I have provided the serrated end 56 on the rod 28. The device is assembled as shown in Fig. 3 but the end 36 is not spun over until the device is tested to see if the thermostatic element operates correctly. If it is necessary to change the tension on the coil element a screw driver may be placed in the kerf 58 of the rod 28 and the rod turned so as to coil or uncoil the thermostatic element for adjustment purposes. After the thermostatic element is properly adjusted by turning rod 28, the reduced end of the rod is spun over, as shown at 36, to hold the parts in adjusted position.

The operation of the device will now be given in connection with an internal combustion engine. The device is placed in a hose line or other conduit of an internal combustion engine. When the liquid within the conduit and engine is cold the thermostatic element will be in the position shown in Fig. 1 and the valve will be closed. As the engine is operated and the water becomes heated, the bimetallic thermostatic element becomes heated immediately and tends to uncoil and in doing so moves the yoke member 38 supported on rod 28. Movement of the yoke member 38 causes the pin 46 of the valve 12 to be moved in the slot 44' of the enlarged head of the yoke member. As shown the slot 44' has a cam surface so that for about the first third of the opening of the valve there is but a slight movement of the valve to permit gradual mixing of the hot and the cold water. As the water becomes hotter and the thermostatic element expands further, the yoke member is moved further so that the pin 46 rides in the groove 44 to open the valve 12 to open position as shown in Fig. 2. The cam surafce of slot 44' controls the rate of movement of the valve. While the rate of movement of the bimetallic coil may be constant, the rate of movement of the valve will be controlled by the cam surface of slot 44' in any manner desired within the limits of the open and closed positions of the valve. When the water cools, the reverse of the above operation takes place and the valve is moved to closed position.

It is to be understood that the foregoing form of construction is given by way of illustration and that the same may be modified in many particulars without departing from the spirit of my invention.

What I claim is:

1. A device of the character described, including a tubular member, a valve pivotally mounted therein for controlling the flow of liquid through said tubular member, a rod rigidly secured to an extension of said tubular member, a thermostatic coil element having one end secured to said rod, a yoke pivotally mounted on said rod and being connected to the other end of said thermostatic element, said yoke being provided with a cam slot at its upper end for receiving a pin on said valve for controlling the rate of opening movement of said valve when said thermostatic coil element is actuated.

2. A device of the character described, including a tubular member, a valve pivotally mounted therein for controlling the flow of liquid therethrough, a rod rigidly secured to an extension of said tubular member, a coiled bimetallic element having one end secured to said rod, a yoke member pivotally mounted on said rod and having spaced legs supported by said rod, the other end of said bimetallic element being connected to said yoke member, said yoke member being connected to said valve by a pin and slot construction, said slot being formed with a cam surface to control the rate of movement of said valve when said bimetallic element is actuated.

3. A device of the character described, including a tubular member, a valve pivotally mounted therein for controlling the flow of liquid therethrough, a rod rigidly secured to an extension of said tubular member, a coiled bimetallic element having one end secured to said rod, a yoke member pivotally mounted on said rod and having spaced legs provided with openings to receive said rod to support said yoke member, the other end of said bimetallic element being connected to said yoke member, the upper portion of said yoke member and said valve being connected together by a pin and slot construction.

4. A device of the character described, including a tubular member, a valve mounted therein for controlling the flow of liquid therethrough, a rod rigidly secured to an extension of said tubular member, a coiled bimetallic element having one end secured to said rod, a yoke member pivotally mounted on said rod and having spaced legs supported by said rod, the other end of said bimetallic element being connected to said yoke member, and means for connecting said valve and said yoke member whereby said yoke member actuates said valve and controls the rate of movement of said valve when said bimetallic element is actuated.

5. A device of the character described, including a tubular member, a valve pivotally mounted therein for controlling the flow of liquid therethrough, said tubular member having alined openings in its lower end, a rod mounted and held within said openings, a coiled bimetallic element having one end secured to said rod, a yoke member having spaced legs provided with openings at their lower ends to receive said rod so that said yoke member is pivotally mounted on said rod, said legs having openings adjacent the upper end of said yoke member for receiving the other end of said bimetallic element so that actuation of said bimetallic element moves said yoke member, and means for connecting said yoke member and said valve whereby said yoke member actuates and controls the movement of said valve.

6. A device of the character described, including a tubular member, a valve pivotally mounted therein for controlling the flow of liquid therethrough, said tubular member having alined openings in its lower end, a rod mounted and held within said openings, a coiled bimetallic element having one end secured to said rod, a yoke member having spaced legs provided with openings at their lower ends to receive said rod so that said yoke member is pivotally mounted on said rod, said legs having an opening adjacent the upper end of said yoke member for receiving the other end of said bimetallic element so that actuation of said bimetallic element moves said yoke member, and means for connecting said yoke member and said valve whereby said yoke member actuates and controls the movement of said valve, said means including a pin and slot connection, the slot having a cam surface for controlling the rate of movement of said valve.

7. A device of the character described, including a tubular member, a valve pivotally mounted therein for controlling the flow of liquid therethrough, said tubular member having alined openings in its lower end, a rod mounted and held within said openings, a coiled bimetallic element having one end secured to said rod, a yoke member having spaced legs provided with openings at their lower ends to receive said rod so that said yoke member is pivotally mounted on said rod, said legs having openings adjacent the upper end of said yoke member for receiving the other end of said bimetallic element so that actuation of said bimetallic element moves said yoke member, and means for connecting said yoke member and said valve whereby said yoke member actuates and controls the movement of said valve, one end of said rod being serrated for cooperation with the periphery of one of said leg openings to hold the rod in adjusted position when the parts are being assembled for correct operation.

8. A device of the character described, including a tubular member, a valve pivotally mounted therein for controlling the flow of liquid therethrough, said tubular member having alined openings in its lower end, a rod mounted and held within said openings, a coiled bimetallic element having one end secured to said rod, a yoke member having spaced legs provided with openings at their lower ends to receive said rod so that said yoke member is pivotally mounted on said rod, said legs having an opening adjacent the upper end of said yoke member for receiving the other end of said bimetallic element so that actuation of said bimetallic element moves said yoke member, and means for connecting said yoke member and said valve whereby said yoke member actuates and controls the movement of said valve, one end of said rod being serrated for cooperation with the periphery of one of said leg openings to hold the rod in adjusted position when the parts are being assembled and adjusted, the other end of said rod being spun over after the parts are correctly positioned to securely hold the parts in assembled condition.

9. A device of the character described, including a tubular member, a valve pivotally mounted therein for controlling the flow of liquid therethrough, a rod rigidly secured to an extension of said tubular member, a coiled bimetallic element having one end secured to said rod, a yoke member pivotally mounted on said rod and having spaced legs supported by said rod, the other end of said bimetallic element being connected to said yoke member, said yoke member having an enlarged head provided with a slot, a pin on said valve received in said slot and forming a connecting means between said valve and said yoke member, said valve being provided with a depressed portion to receive one end of said enlarged head on said yoke member.

MARSHALL H. WARD.